United States Patent
Cherng et al.

(10) Patent No.: US 7,560,900 B2
(45) Date of Patent: Jul. 14, 2009

(54) RECHARGEABLE LITHIUM BATTERY PROTECTION DEVICE

(75) Inventors: Jing-Yih Cherng, Tao-Yuan (TW); Wei-Chen Wu, Tao-Yuan (TW); Steven Hou, Tao-Yuan (TW); Samual Chen, Tao-Yuan (TW)

(73) Assignee: Amita Technologies Inc. Ltd., Taoyuan (TW)

( * ) Notice: Subject to any disclaimer, the term of this patent is extended or adjusted under 35 U.S.C. 154(b) by 112 days.

(21) Appl. No.: 11/325,378

(22) Filed: Jan. 5, 2006

(65) Prior Publication Data
US 2007/0152637 A1    Jul. 5, 2007

(51) Int. Cl.
*H02J 7/00* (2006.01)
*G01N 27/416* (2006.01)
*H02H 3/20* (2006.01)

(52) U.S. Cl. .................. 320/134; 320/136; 320/162; 324/426; 324/434; 361/91.4

(58) Field of Classification Search .......... 320/116, 320/128, 134, 135, 136, 162; 324/426, 429, 324/434, 445; 361/91.2, 91.4
See application file for complete search history.

(56) References Cited

U.S. PATENT DOCUMENTS

| | | | | |
|---|---|---|---|---|
| 2,621,231 A | * | 12/1952 | Medlar et al. | 324/434 |
| 6,081,095 A | * | 6/2000 | Tamura et al. | 320/118 |
| 6,252,376 B1 | * | 6/2001 | Nakamura et al. | 320/132 |
| 6,400,124 B1 | * | 6/2002 | Hidaka et al. | 320/145 |
| 6,713,989 B1 | * | 3/2004 | Reynolds | 320/165 |
| 2006/0001403 A1 | * | 1/2006 | Yudahira | 320/134 |
| 2006/0267592 A1 | * | 11/2006 | Choi | 324/426 |

* cited by examiner

*Primary Examiner*—Akm E Ullah
*Assistant Examiner*—Johali A Torres Ruiz

(57) ABSTRACT

A rechargeable lithium battery protection device uses an external circuit to control charging or discharging a rechargeable lithium battery for preventing an overcharge or an overdischarge of the battery. The rechargeable lithium battery protection device includes a diagnostic circuit, a light coupling circuit, a balance circuit, and an identifier circuit. The battery diagnostic circuit checks the voltage of the chargeable battery and outputs a detect signal, and then the balance circuit determines whether or not the detect signal is an overcharge signal and discharges the battery. Meanwhile, the light coupling circuit adjusts an impedance of the light coupling circuit according to the detect signal for disconnecting the battery from the external circuit and the identifier circuit provides the position of a battery that sends out the signal.

1 Claim, 5 Drawing Sheets

RECHARGEABLE LITHIUM BATTERY PROTECTION DEVICE

BACKGROUND OF THE INVENTION

1. Field of the Invention

The present invention relates to a serial-parallel battery module control circuit, and more particularly to a rechargeable lithium battery protection device.

2. Description of Prior Art

In general, rechargeable batteries such as nickel-cadmium (Ni—Cd) batteries and nickel-hydrogen (Ni-MH) batteries are popular in many electrical applications. The Ni—CD battery is a pervious-generation product and has been phased out from the market. The major disadvantage of the Ni—Cd battery resides on that the Ni—Cd battery has a memory effect and comes with a short life. Furthermore, cadmium is a heavy metal which may cause environmental contamination easily. Therefore, a Ni—MH battery was developed to overcome the shortcomings of the Ni—Cd battery by reducing or eliminating the memory effect of the Ni—Cd battery, improving the capacitance, resisting an overcharge or an overdischarge, extending the life of use, and shortening the charging time. Mostly important, the poisonous heavy metal is not used and thus greatly reducing the environmental contamination problem. Of course, the Ni—MH battery is not perfect either, and its adaptability to the environment is low, and thus it cannot be used at a temperature above 45° C. or below 0° C. Therefore, the Ni—MH battery cannot supply power to electronic equipments at an extremely hot or extremely cold place. Further, if the Ni—MH battery is not used for a while after being fully charged, the power will be lost substantially, and thus the battery requires a recharge.

In view of above, a rechargeable lithium battery is developed to provide more advantages. However, if the rechargeable lithium battery is charged with an over-voltage current, there will be a risk of an explosion of the battery. On the other hand, if the rechargeable lithium battery is discharged with an excessively low voltage, and the rechargeable lithium battery is lower than a basic voltage, the life of use of the rechargeable lithium battery will be affected adversely. Therefore, the rechargeable lithium battery generally adds a protection device as shown in FIG. 1 for its use (during charging or discharging).

In FIG. 1, four pieces of rechargeable lithium batteries are used for the illustration of the invention, and the protection device 100 comprises four batteries connected in series for a special use of a protection IC 101 and a circuit switch 103. In an actual design, an appropriate protection IC 101 is selected according to the number of serially connected rechargeable lithium batteries 102. If the protection IC 101 is charged or discharged, the voltage of each rechargeable lithium battery 102 will be detected. If an abnormal voltage of the rechargeable lithium battery 102 is detected, the protection IC 101 will send a signal to the circuit switch 103 to disconnect the circuit switch 103 and cut off a charging current or a discharging current. If the number of the serially connected rechargeable lithium batteries 102 varies, it is necessary to design and make a new protection device 100. Furthermore, most manufacturers provide at most four serially connected rechargeable lithium batteries 102 for the protection ICs 100, because the more the rechargeable lithium batteries 102, the more complicated is the circuit design of the protection IC 101. The complexity of the circuit and the aging of the battery may create an unbalanced problem, and thus the protection circuit for five or more serially connected rechargeable lithium batteries is difficult to make.

SUMMARY OF THE INVENTION

The present invention is to overcome the shortcoming of the prior art and avoid the existing deficiency by redesigning the chargeable battery protection device without having to take the number of serially connected rechargeable lithium batteries into consideration. Each rechargeable lithium battery is connected in parallel with a same circuit board, and the circuit board has an interface for connecting the batteries, so that if any serially connected battery is abnormal, a signal will be produced to notice the position of the system and the serially connected battery, or disconnect a circuit switch to cut off the charging or discharging current.

Another, the present invention is to determine whether or not the rechargeable lithium battery is overcharged, and tune the balance of each serially connected battery, if any serially connected battery is abnormal and connected in parallel with the circuit board.

Further, the present invention is to easily increase or decrease the number of serially connected rechargeable lithium batteries without redesigning the circuit board, but simply making a simple external wire connection.

Accordingly, the rechargeable lithium battery protection device of the present invention used for controlling an external circuit to charge or discharge a rechargeable lithium battery and preventing an overcharge or an overdischarge of the chargeable battery, the rechargeable lithium battery protection device comprises: a diagnostic circuit, a light coupling circuit, a balance circuit, and an identifier circuit. The diagnostic circuit checks the voltage of the chargeable battery and outputs a detect signal, and then the balance circuit determines whether or not the detect signal is an overcharge signal and discharges the rechargeable lithium battery. Meanwhile, the light coupling circuit adjusts an impedance of the light coupling circuit according to the detect signal for disconnecting the connection between the rechargeable lithium battery and the external circuit and the identifier circuit provides the position of the battery that sends out the signal.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings.

Figure 1:
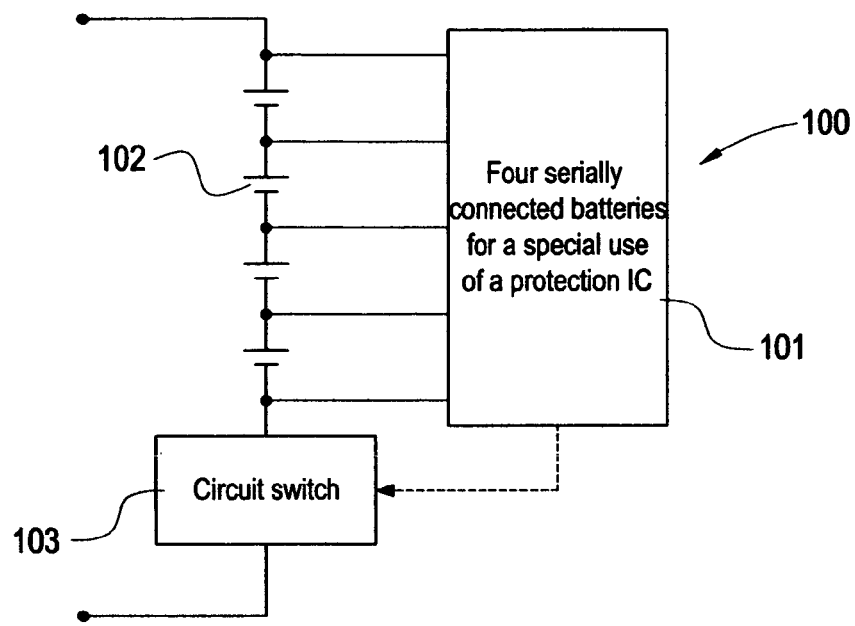
FIG. 1 is a schematic circuit diagram of a prior art rechargeable lithium battery protection device.
Figure 2:
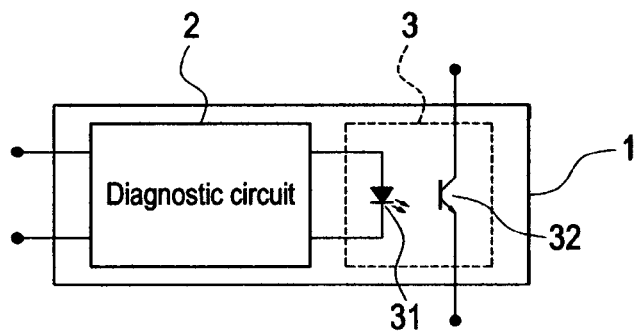
FIG. 2 is a schematic circuit diagram of a rechargeable lithium battery protection device being connected in parallel according to the present invention.
Figure 3:
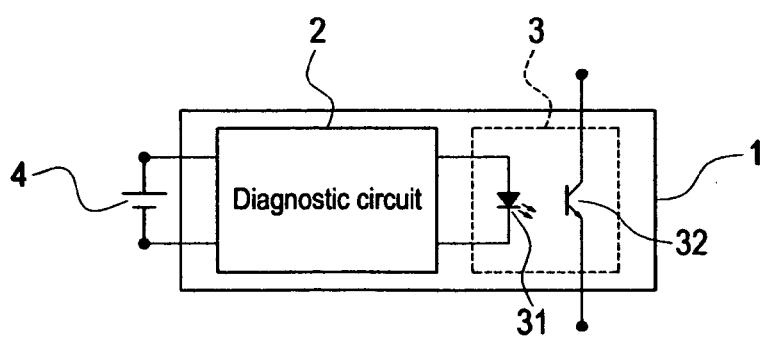
FIG. 3 is a schematic circuit diagram of a rechargeable lithium battery protection device being connected in parallel with parallel connected batteries according to the present invention.

Referring to FIGS. 2 and 3 for schematic circuit diagrams of a parallel connected module of a rechargeable lithium battery protection device and a parallel connected module of a rechargeable lithium battery protection device being connected in parallel to the battery according to the present invention, the protection device 1 comprises a diagnostic circuit 2 and a light coupling circuit 3.

The diagnostic circuit 2 checks the voltage of the chargeable battery 4 and outputs a detect signal to the light coupling circuit 3.

The light coupling circuit 3 adjusts an impedance of the light coupling circuit 3 according to the detect signal for disconnecting the connection between the protection device 11 and the external circuit or charging or discharging the chargeable battery 4.

The light coupling circuit 3 comprises a light emitting diode 31 and a transistor 32. The light emitting diode 31 is electrically coupled to the diagnostic circuit 2 for determining whether or not to emit lights according to the voltage of the chargeable battery 4. The transistor 32 is electrically coupled to the external circuit and determines the impedance of the transistor 32 according to the condition whether or not the light emitting diode 31 emits lights for connecting or disconnecting the external circuit.

In this preferred embodiment, if the battery 4 is normal, the diagnostic circuit 2 will send a detect signal of a voltage of the chargeable battery 4 to the light emitting diode 31 of the light coupling circuit 3. After the light emitting diode 31 receives the detect signal, the light emitting diode 31 starts emitting and projecting lights onto another side of the transistor 32 to greatly lower the impedance at both ends of the transistor 32.

If the battery 4 is abnormal, the diagnostic circuit 2 will stop sending the signal to the light emitting diode 31, so that the light emitting diode 31 will stop emitting lights. When there is no light projected on the other side of the transistor 32, the impedance at both ends of the transistor 32 will become very high to reach a state close to a disconnected circuit state.

Figure 4:
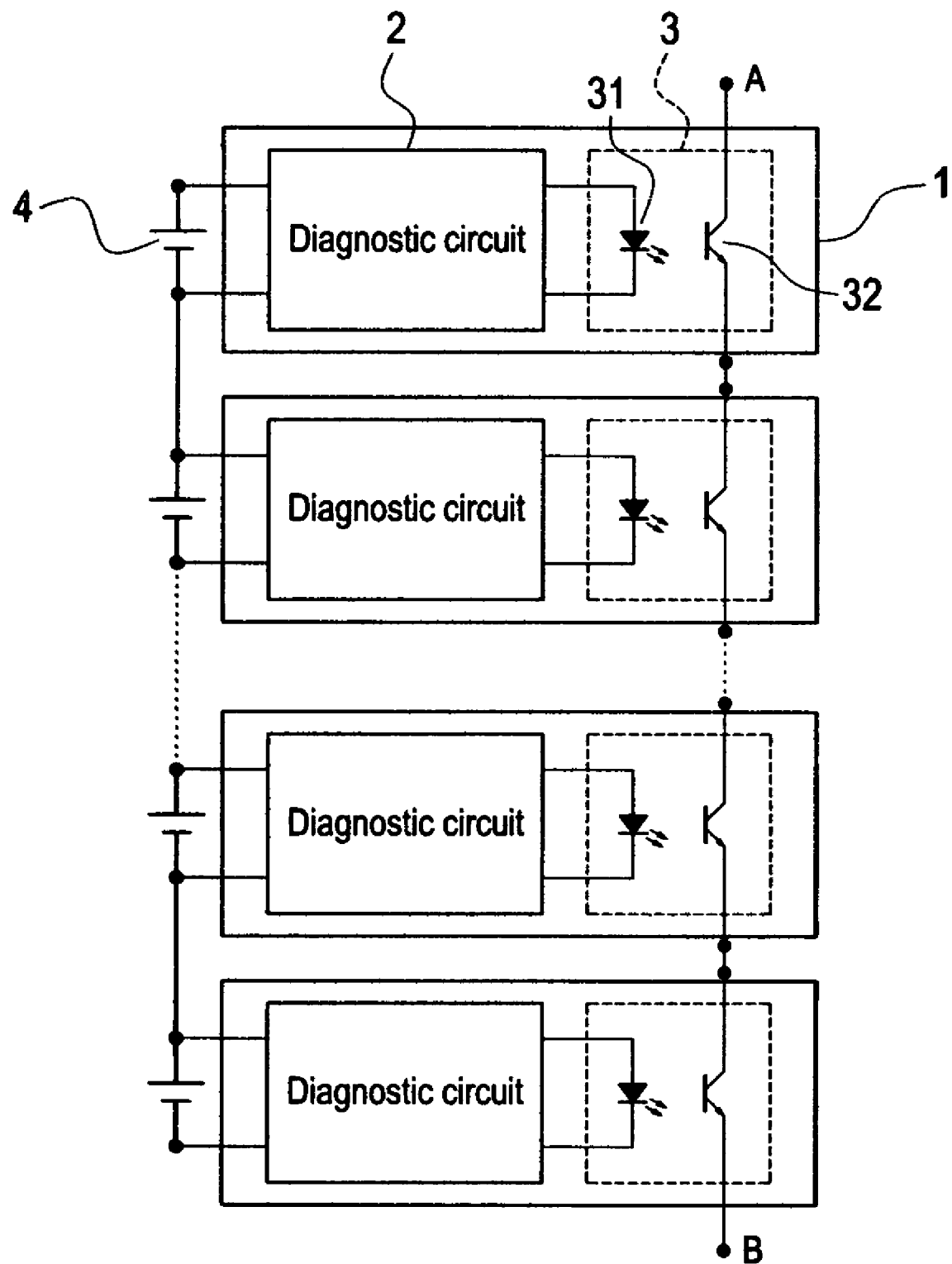
FIG. 4 is a schematic circuit diagram of a rechargeable lithium battery protection device being connected in parallel with several rechargeable lithium batteries according to the present invention.

Since the light projected onto both sides of the light coupling circuit 3 is used for the communication, it is not necessary to have any electric contact, and both sides have a very high insulation which can be used for serially connecting many pieces of parallel connected modules of rechargeable lithium batteries 4 as shown in FIG. 4, and both ends of the transistor 32 of each module are connected in series, so as to electrically isolate both ends of the whole series of transistors 32 and both ends of the whole series of rechargeable lithium batteries 4.

In FIG. 4, if any series of rechargeable lithium batteries 4 is abnormal, the diagnostic circuit 2 will send out a detect signal to stop the light emitting diode 32 from emitting lights, so that no light will be projected onto another side of the transistor 32, and the impedance at both sides of the transistor 32 become very high and almost disconnected. Since the transistors 32 are serially connected with each other, therefore the impedance at both ends of the whole series of transistors 32 becomes very high and almost disconnected.

On the contrary, if all rechargeable lithium batteries 4 are normal, the impedance at both ends A, B of the whole series of transistors 32 is very low. If any series of rechargeable lithium batteries 4 is abnormal, the impedance at both ends A, B is very high and almost disconnected.

Figure 5:
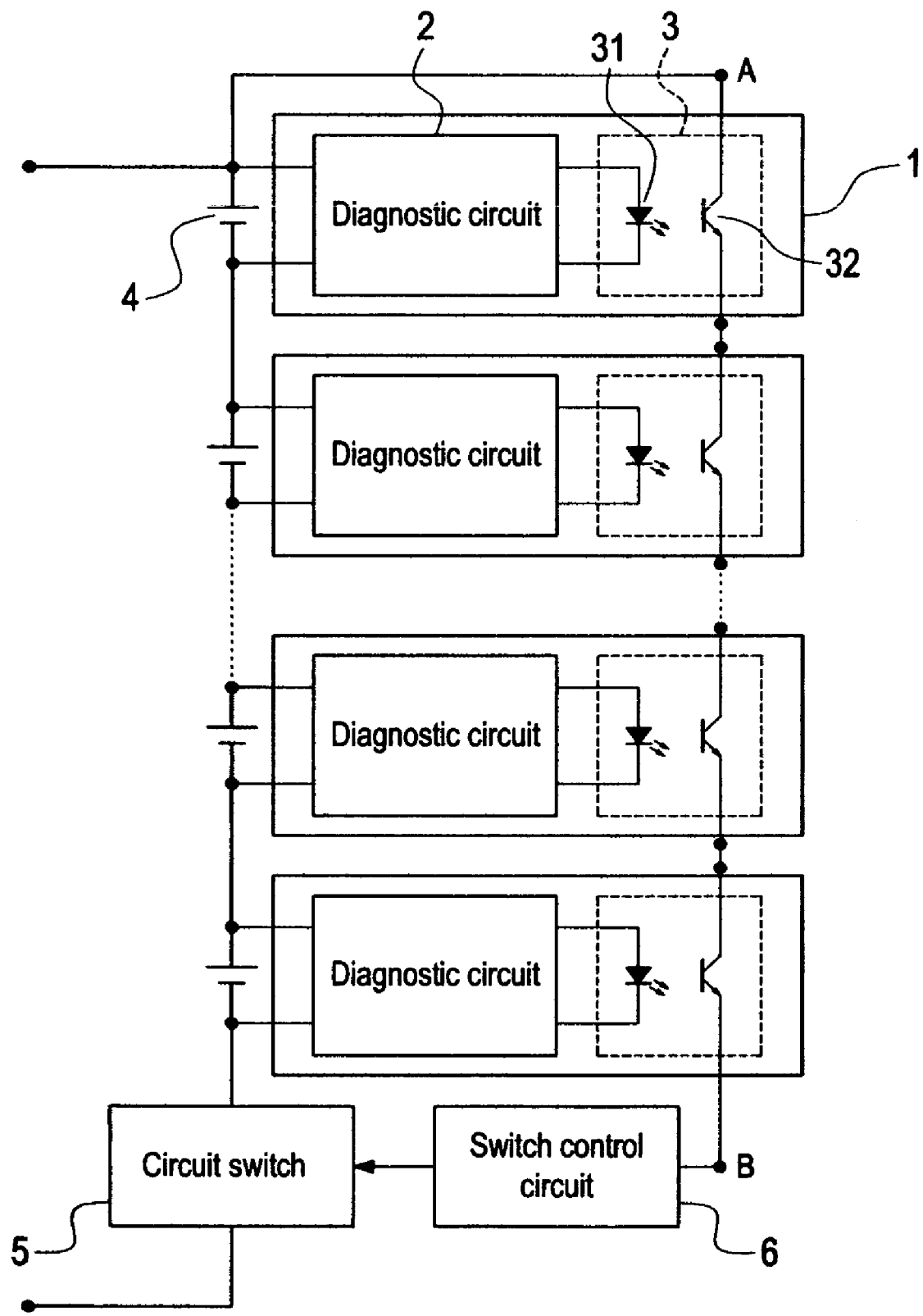
FIG. 5 a schematic circuit diagram of another rechargeable lithium battery protection device being connected in parallel with several rechargeable lithium batteries according to the present invention.

Further, the impedance change at both ends A, B of the transistor 32 is used for designing a rechargeable lithium battery protection device 1 serially connected to several rechargeable lithium batteries 4 according to a schematic circuit diagram as shown in FIG. 5.

In this preferred embodiment, the protection device further designs a circuit switch 5 and a switch control circuit 6, wherein the switch control circuit 6 is electrically coupled to the light coupling circuit 3 of the last level to output a control signal according to an impedance output of the light coupling circuit 3. The circuit switch 5 is electrically coupled to the switch control circuit 6 and determines whether or not to disconnect a charging current or a discharging current according to the control signal.

If the impedance at both ends A, B is very low, then the circuit switch 5 will be electrically connected; on the other hand, if the impedance at both ends A, B is very high, then the circuit switch 5 will be disconnected to cut off the charging current or discharging current.

Figure 6:
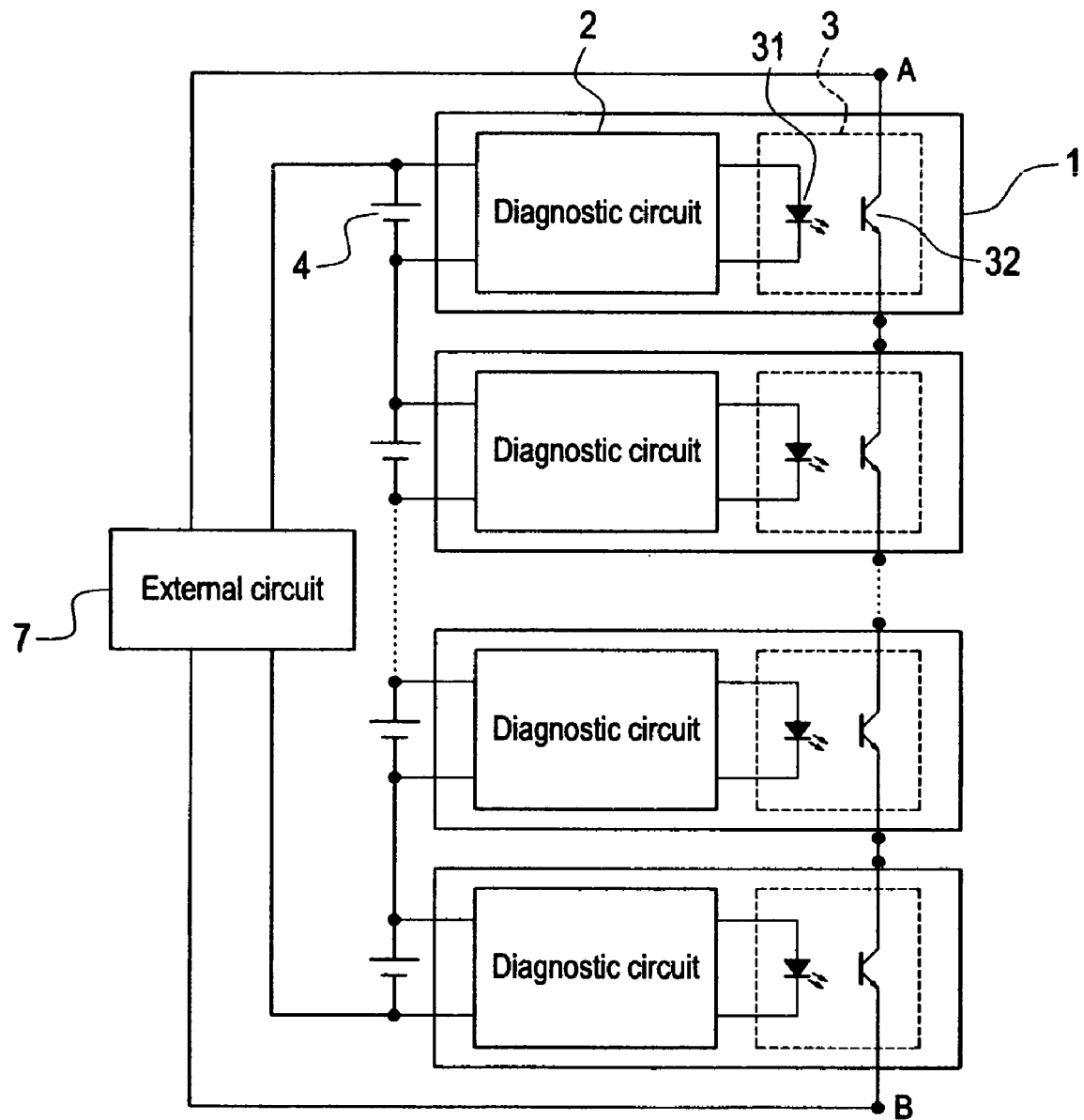
FIG. 6 is a schematic circuit diagram of a rechargeable lithium battery protection device being connected in series with several rechargeable lithium batteries and an external circuit according to the present invention.

Referring to FIG. 6 for the schematic circuit diagram of several rechargeable lithium batteries of a rechargeable lithium battery protection device being connected in parallel with an external circuit according to the present invention, both ends A, B are electrically coupled to the external circuit 7, wherein the external circuit 7 could be a system or a battery charger, but not limited to such devices.

In FIG. 6, the diagnostic circuit 2 uses the impedance change occurred at both ends A, B to notice the external circuit 7. Therefore, if the external circuit 7 detects a very low impedance at both ends A, B, the external circuit 7 will operate normally. If the external circuit 7 detects a very high impedance at both ends A, B, the external circuit 7 will stop to cut off the charging current or discharging current.

Figure 7:
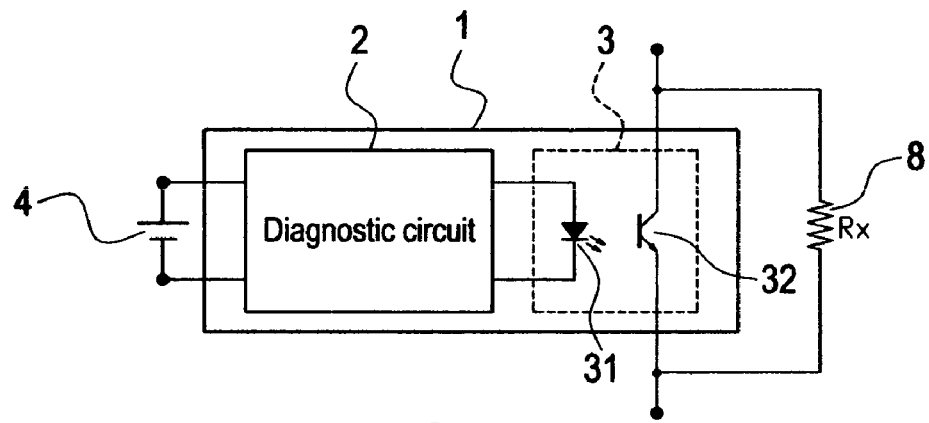
FIG. 7 is a schematic view of a rechargeable lithium battery protection device according to another preferred embodiment of the present invention.

Referring to FIG. 7 for the schematic view of a rechargeable lithium battery protection device according to another preferred embodiment of the present invention, the light coupling circuit 3 of the protection device 1 is electrically coupled to an identifier circuit 8, and the identifier circuit 8 is a resistance RX. The light coupling circuit 3 adjusts an impedance according to the detect signal for disconnecting the connection between the chargeable battery 4 and the external circuit. Meanwhile, the identifier circuit 8 outputs a signal (resistance) to inform the external circuit, so that the external circuit knows which battery 4 is abnormal. For example, if the light coupling circuit 3 of each protection device 1 is electrically coupled to the identifier circuit 8 as shown in FIG. 4, and each identifier circuit 8 is set to a resistance such as 5K, 10K, 15K, or 20K. If the light coupling circuit 3 of the second protection device 1 is in a disconnected status, the external circuit can receive the resistance of 10K, and thus can know that the second battery is abnormal.

Figure 8:
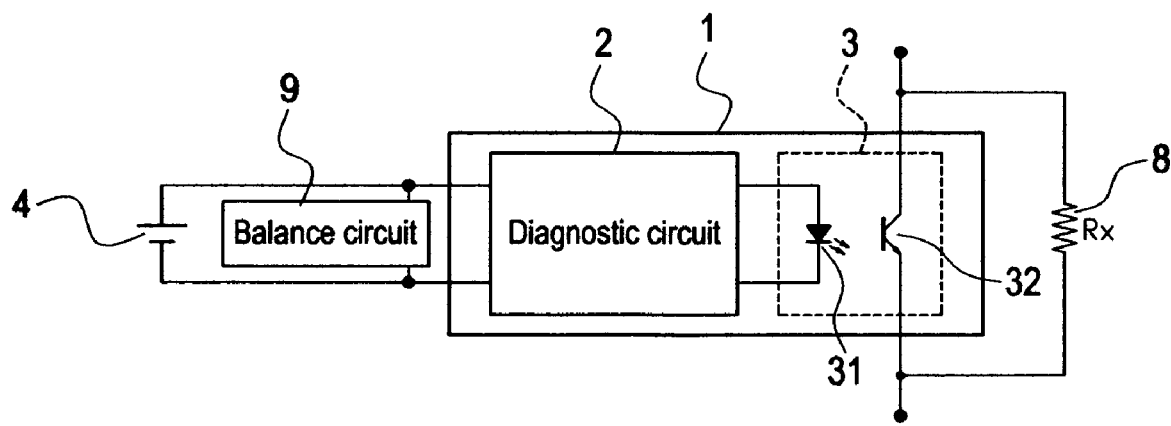
FIG. 8 is a schematic view of a rechargeable lithium battery protection device according to a further preferred embodiment of the present invention.

Referring to FIG. 8 for the schematic view of a rechargeable lithium battery protection device according to a further preferred embodiment of the present invention, the light coupling circuit 3 of the protection device 1 is electrically coupled to an identifier circuit 8, and the diagnostic circuit 2 is electrically coupled to a balance circuit 9. If the battery 4 is overcharged, the diagnostic circuit 2 will output a detect signal to the balance circuit 9, so that the balance circuit 9 controls the battery 4 to discharge, so as to prevent the battery from being overcharged or damaged.

The present invention are illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A rechargeable lithium battery protection device for controlling an external circuit to charge or discharge a plurality of rechargeable lithium batteries, the protection device comprising:

a plurality of diagnostic circuits, each of the diagnostic circuits electrically coupled to only one of the rechargeable lithium batteries, respectively, wherein each of the diagnostic circuits checks the voltage of the chargeable battery connected thereto and outputting a detect signal for checking the voltage of the single rechargeable lithium battery and outputting a detect signal;

a plurality of light coupling circuits, each of the light coupling circuits electrically coupled to an associated diagnostic circuit for adjusting an impedance of the light coupling circuit according to the detect signal output from the associated diagnostic circuit for disconnecting the connection between the rechargeable lithium battery and the external circuit or charging or discharging the rechargeable lithium battery; and a plurality of resistors, each of the resistors parallel connected to an output port of one of the light coupling circuits, wherein the resistors have resistances different from each other;

whereby the rechargeable lithium battery protection device can identify at least one abnormal rechargeable lithium battery by measure the overall resistance of the resistors at the output ports of the light coupling circuits.

* * * * *